P. BROWN & F. J. BOSTOCK.
CLAMPING NUT OR FORCING JACK.
APPLICATION FILED OCT. 8, 1913.

1,100,527.

Patented June 16, 1914.
2 SHEETS—SHEET 1.

Witnesses
W. Allen
W. E. Allen

Inventors
Percy Brown, and
Francis J. Bostock,
by Herbert W. Jenner.
Attorney

P. BROWN & F. J. BOSTOCK.
CLAMPING NUT OR FORCING JACK.
APPLICATION FILED OCT. 8, 1913.
1,100,527.
Patented June 16, 1914.
2 SHEETS—SHEET 2.
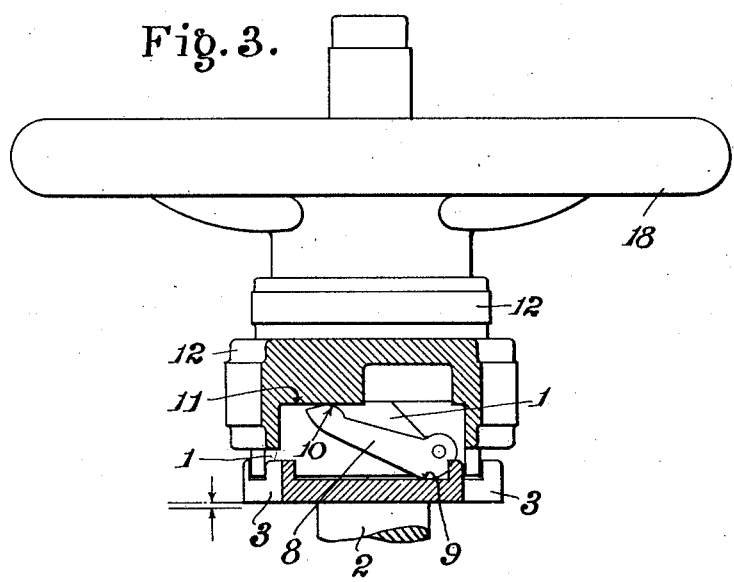
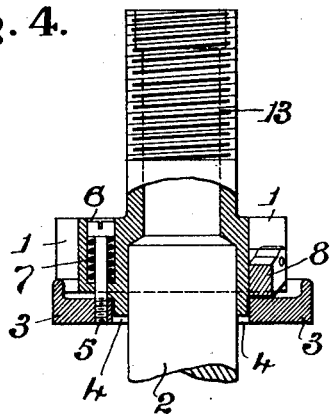

UNITED STATES PATENT OFFICE.

PERCY BROWN AND FRANCIS JOHN BOSTOCK, OF HUDDERSFIELD, ENGLAND.

CLAMPING-NUT OR FORCING-JACK.

1,100,527.  Specification of Letters Patent. Patented June 16, 1914.

Application filed October 8, 1913. Serial No. 794,050.

*To all whom it may concern:*

Be it known that we, PERCY BROWN and FRANCIS JOHN BOSTOCK, subjects of King George V of Great Britain, residing at Huddersfield, in the county of York, England, have invented certain new and useful Improvements in Clamping-Nuts or Forcing-Jacks, of which the following is a specification.

Our invention has reference to the securing of objects or parts, such for instance as wheel blanks, on arbors or spindles, and comprises new or improved means whereby a considerable force can be exerted with little effort to grip or force the blank or other part against a collar or shoulder on the spindle or to press said part on to a tapered portion of the spindle, or otherwise force one member on to or into intimate engagement with another member so that the two members are rigidly connected together with frictional contact.

Our invention will be described with reference to the accompanying drawings, in which:—

Figure 1:
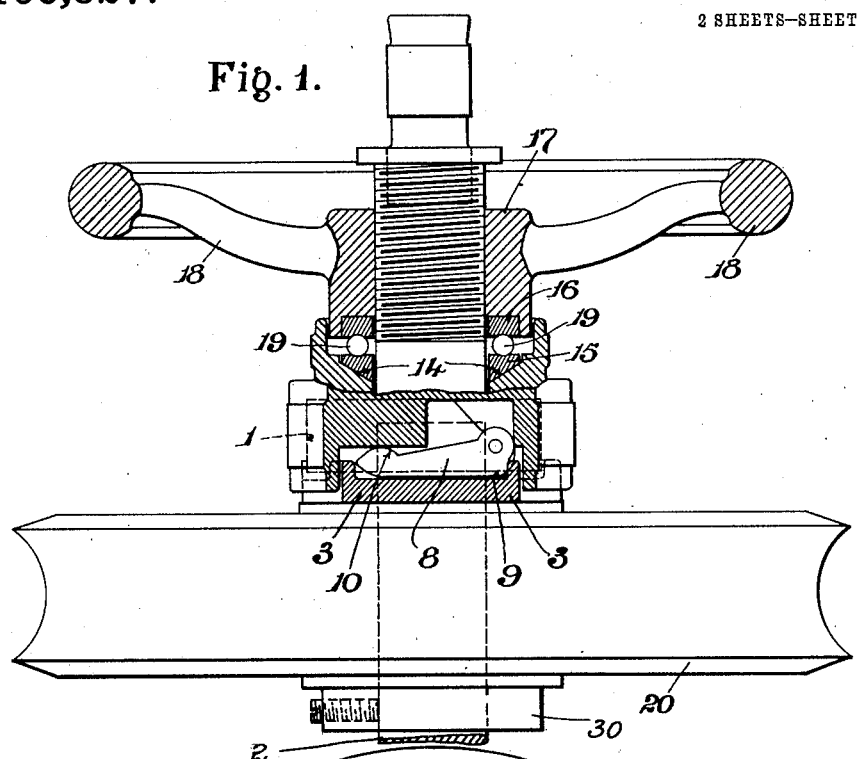
Figure 2:
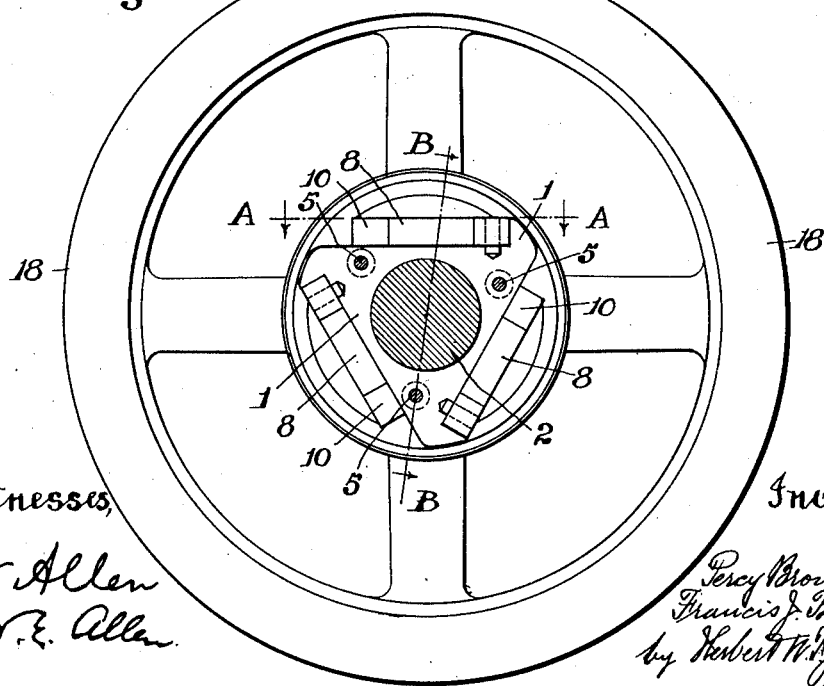

Figure 1 is a sectional elevation of the device the plane of the section of the lower part of the figure being that of the line A—A, Fig. 2, looking in the direction of the arrows thereon, while the plane of the upper part is a line passing through the center of the spindle; Fig. 2 is an underneath view of the device, the plate or washer being removed; Fig. 3 is a section on the line A—A, Fig. 1, showing the positions of the parts when inoperative, and Fig. 4 is a detail section on the line B—B, Fig. 1.

Referring to the drawings, our improved device comprises a part or block 1 screwed or otherwise secured by pins, cotter or other known means of fastening on to the end of the work spindle or arbor 2.

Yieldingly connected to the part 1 is a washer or plate 3 having a central opening 4 (Fig. 4). The connection between the parts 1 and 3 is effected by means of a series of headed screws 5 (Figs. 2 and 4) which said screws project outwardly from the face of the washer or plate 3 and extend into openings or recesses such as 6 (Fig. 4) in the part 1. Springs such as 7 are confined on the screws 5 between the heads of said screws and the inner ends of the recesses or openings. Movement of the washer or plate away from the part 1 is resisted by the springs, which serve to return the said washer or plate to normal position as will be afterward explained.

Pivoted to the part 1 are a series of levers 8, in this instance three in number, which said levers have cam portions 9 adapted to bear against the outer face of the washer or plate 3, and curved portions 10 at their free ends adapted to bear against respective shoulders or projections such as 11 (see Figs. 1 and 3) on a cap or part 12 loosely mounted on the extension 13 of the part 1.

The outer face of the part 12 is cupped as at 14, Fig. 1, to receive a correspondingly shaped ring 15. Between this ring and a ring 16 carried by the boss 17 of a hand wheel 18 working in the screwed part 13 are placed a series of balls 19.

The operation of the device is as follows:—When the hand wheel 18 is rotated in a direction to cause its boss to travel inward on the part 13, the cap or part 12 is moved inward, and the projections 11 are caused to press upon the outer or free ends 10 of the levers 8. The turning of said levers on their pivots causes the cam surfaces 9 thereon to act upon the washer or plate 3 and, by reason of the great leverage obtained, to force said washer or plate away from the part 1 with enormous force. If, therefore, the inner face of the washer or plate 3 is caused to abut against the part to be secured on the spindle or arbor 2, as for instance against the part 20, Fig. 1, which may be taken as representing a wheel blank, it will be obvious that the operation of the device will cause the part 20 to be firmly secured whether it be by binding it against a collar or clamping abutment 30 on the spindle 2. This abutment may be of any other approved form. When the hand wheel is rotated to cause it to travel outward on the part 13, the springs 7 act to draw the washer or plate 3 toward the part 1, and the pressure of the said washer against the cam surfaces 9 of the levers 8 causes said levers to turn on their pivots so that their free ends raise the cap or part 12 and cause the same to move outwardly with the hand wheel, as will be understood from Fig. 3. If the faces of the levers 8 or of the parts against which they bear are not true, the cup 14 allows the parts 12 to swivel to accommodate such inaccuracy. The ring 16 could be constructed to fit within a concaved recess in the boss 18.

It will be obvious that the details of construction of our device may be varied in many ways without departing from the spirit and scope of our invention within the scope of the appended claims.

Having thus described our invention, what we claim as new and desire to secure by Letters Patent is:—

1. The combination, with a spindle provided with a clamping abutment for the work, and a block secured on the spindle; of a clamping member slidable on the spindle, levers pivoted to the said block and provided with cams which bear on the slidable clamping member, and means for moving the said levers on their pivots to clamp and release the work between the said abutment and clamping member.

2. The combination, with a spindle provided with a clamping abutment for the work, and a block secured on the spindle; of a clamping member slidable on the spindle, spring-operated pins connecting the slidable clamping member with the said block and normally holding the clamping member out of engagement with the work, levers pivoted to the said block and provided with cams which bear on the slidable clamping member, and means for moving the said levers on their pivots to clamp and release the work between the said abutment and clamping member.

3. The combination, with a spindle provided with a clamping abutment for the work, and a block secured on the spindle and provided with a screwthreaded extension; of a clamping member slidable on the spindle, levers pivoted to the said block and provided with cams which bear on the slidable clamping member, a cap mounted loosely on the said extension and bearing against the free end portions of the levers, and a hand-wheel screwed on the extension and operatively connected with the said cap.

In testimony whereof we affix our signatures in the presence of two witnesses.

PERCY BROWN.
FRANCIS JOHN BOSTOCK.

Witnesses:
T. E. WHITELEY,
C. E. HINCHLIFF.

Copies of this patent may be obtained for five cents each, by addressing the "Commissioner of Patents, Washington, D. C."